3,261,855
METHOD FOR THE PREPARATION OF
$\Delta^{5(10)}$-STEROIDS

Filippus Johannes Zeelen, Oss, Netherlands, assignor to Organon Inc., West Orange, N.J., a corporation of New Jersey
No Drawing. Filed Apr. 17, 1964, Ser. No. 360,746
Claims priority, application Netherlands, Apr. 25, 1963, 291,993
5 Claims. (Cl. 260—397.5)

The invention relates to an improved process for the preparation of $\Delta^{5(10)}$-steroids non-substituted in the 3-position.

Various methods are known for the preparation of $\Delta^{5(10)}$-steroids non-substituted in the 3-position. One of these methods consists in the reaction of a $\Delta^{1,3,5(10)}$-oestratriene compound having in 3-position an etherified hydroxyl group with an alkali metal dissolved in liquid ammonia or in a lower aliphatic primary amine, followed by the isolation of the desired $\Delta^{5(10)}$-compound of the oestrane series from the reaction mixture containing a number of other products whether or not oxygenated in 3-position. Another method is characterized in that a $\Delta^4$-oestrene compound non-substituted in the 3-position is taken as starting material, to the double bond of which hydrochloric acid is added, after which the thus obtained 5-chloro-oestrane compound is treated with a dehydrohalogenating agent to obtain the desired $\Delta^{5(10)}$-compound.

The disadvantage of the said methods is that yields are pretty low. This holds good particularly for the first-mentioned method, but the second, too, usually gives yields of the desired product of only about 35%.

As the $\Delta^{5(10)}$-oestrene compounds have proved to be of great significance owing to their valuable biological properties, such as ovulation inhibiting, anabolic, androgenic, progestative and gonad inhibiting properties, it is of course of substantial importance to develop profitable methods for the preparation of these compounds.

A new method has now been found for the preparation of in 3-position non-substituted $\Delta^{5(10)}$-steroids in the 3-position, characterized in that a $\Delta^{5(6)}$-19-hydroxy-steroid non-substituted in the 3-position is reacted with a metal acylate with oxidizing activity, the thus obtained $\Delta^{5(10)}$-6-acyloxy-steroid is hydrolysed, the 6-hydroxy compound obtained is subsequently oxidized into a 6-ketosteroid, after which the thus obtained $\Delta^{5(10)}$-6-keto-oestrene compound is thioketalized in the known manner and the 6-thioketal group is finally split off reductively, The present method is generally applicable to all $\Delta^{5(6)}$-19-hydroxy-steroids, but is of special importance starting from $\Delta^{5(6)}$-19-hydroxy-steroids of the androstane series in view of the thus obtain biologically active end-products.

The $\Delta^{5(6)}$-19-hydroxy-steroids to be used as starting products in the present process can be prepared by converting a $\Delta^{5(6)}$-steroid non-substituted in the 3-position into the corresponding 5$\alpha$-bromo-6$\beta$-hydroxy-steroid by means of hypobromous acid or an hypobromous-acid yielding agent, treating the said steroid with a metal acylate, such as lead tetra-acetate, for the preparation of the corresponding 6,19-oxido-steroid, and subsequently converting this compound by treatment with a dehydrobrominating agent and reductive spliting the 6,19-oxido-ring into the desired $\Delta^{5(6)}$-19-hydroxy-steroid non-substituted in the 3-position.

The same products can be obtained by using hypochlorous acid or a hypochlorous acid-yielding agent instead of hydobromous acid for the preparation of the corresponding 5$\alpha$-chloro-6$\beta$-hydroxy compound.

The dehydrohalogenation of the 5$\alpha$-halogen compound and the reductive splitting of the 6,19-oxido-ring may be performed in two separate reaction steps in arbitrary order, but it is also possible to perform these two conversions simultaneously, for example by treatment of the 5$\alpha$-halogen-6,19-oxido compound with zinc in the presence of a lower aliphatic carboxylic acid or an inert organic solvent, such as a lower aliphatic alcohol.

According to the process of the invention the $\Delta^{5(6)}$-19-hydroxy-steroids described before are treated with a metal acylate having an oxidizing activity, such as a lead tetra-acylate, for instance, lead tetra-actate and lead tetra-propionate, a silver acylate and a mercury acylate. Under the influence of such metal acylates $\Delta^{5(6)}$-19-hydroxy-steroids are converted into the corresponding $\Delta^{5(10)}$-6-acyloxy steroids. The said reaction is performed in the presence of an inert solvent, such as aliphatic or aromatic hydrocarbons, e.g. hexane, cyclohexane or benzene.

It is preferred to perform the reaction in the presence of an acid binding agent. For this purpose weak bases may be used, such as alkaline earth metal carbonates or tertiary organic bases, such as pyridine or collidine. The thus obtained $\Delta^{5(10)}$-6-acyloxy-steroids are next hydrolysed into the free 6-hydroxy compounds. The hydrolysis may be performed by, e.g. treatment with alkali or alkaline earth carbonates, alkali or alkaline earth bicarbonates or alkali or alkaline earth hydroxides.

The thus obtained $\Delta^{5(10)}$-6-hydroxy-steroids non-substituted in the 3-position are next oxidized into the corresponding 6-keto compounds by any method known per se. The oxidation may be performed, e.g. by treatment with chromic acid or by Oppenauer oxidation.

From the thus obtained $\Delta^{5(10)}$-6-keto-steroids non-substituted in the 3-position the 6-keto group is next split off in such a manner that the $\Delta^{5(10)}$-bond does not shift. This conversion is performed by first thioketalizing the 6-keto group and next splitting off the 6-thioketal group reductively.

The thioketalization of the 6-keto group may be performed by one of the known methods, e.g. by condensation of the relative 6-keto-steroid with a mercaptan or dithiol in the presence of zinc chloride or hydrochloric acid and a dehydrating agent, such as sodium sulphate. Another possibility is that the 6-keto-steroid is reacted with the mercaptan or dithiol in the presence of a Lewis acid, such as boron trifluoride.

The 6-keto group is preferably converted into a cyclic thioketal by reaction with an alkane dithiol, such as ethane dithiol, propane dithiol or butane dithiol, but also noncyclic thioketals, for instance, those derived from a lower aliphatic mercaptan, such as methyl mercaptan, ethyl mercaptan, propyl mercaptan, thiophenol or benzyl mercaptan, may be used.

The 6-thioketal group is next split off reductively, e.g. by treatment with Raney nickel or by reaction with an alkali metal in the presence of liquid ammonia or a lower aliphatic primary amine.

The alkali metal used in this reaction may be, e.g., lithium, sodium or potassium.

The reductive splitting off of the 6-thioketal group is usually performed in a suitable organic solvent, e.g., an aliphatic ether, such as dimethyl ether, diethyl ether, methylethyl ether, dioxane or tetra hydrofuran.

The invention is illustrated further by the following examples:

Example I 4.8 g. of $\Delta^5$-17$\beta$,19-dihydroxy-androstene-17-benzoate, 9.2 g. of lead tetra-acetate and 9.5 g. of calcium carbonate are suspended in 500 ml. of cyclohexane. After standing for 30 minutes at 60° C. the mixture is heated to boiling and afterwards refluxed for 30 minutes. Next the mixture is cooled down, filtered over Hyflo and the filtrate is washed with water and evaporated to dryness in vacuo after which the residue is recrystallized from methanol to obtain 6,17$\beta$-dihydroxy-$\Delta^{5(10)}$-oestrene-6-acetate-17-benzoate with the melting point of 137–141° C. This product is taken up in 250 ml. of methanol. Next 2 g. of potassium carbonate dissolved in as little water as possible are added, whereupon the mixture is refluxed for 3 hours. By pouring out into water and extraction with chloroform the crude 6,17$\beta$-dihydroxy-$\Delta^{5(10)}$-oestrene-17$\beta$-benzoate is obtained.

The crude product is now taken up in 350 ml. of acetone, whereupon at 0° so much of a solution of 8 N chromic acid is added until the colour of the solution remains orange for some time. After pouring out into water the crude 6-keto-$\Delta^{5(10)}$-oestrene-17$\beta$-ol-17$\beta$-benzoate is obtained by extraction with methylene chloride. This product is purified by chromatography over $SiO_2$. Benzene/ether (4:1) eluates the pure product. After recrystallization from ether the melting point is 154–156° C.

Two g. of 6-keto-$\Delta^{5(10)}$-oestrene-17$\beta$-ol-17$\beta$-benzoate are dissolved in 20 ml. of acetic acid. After the addition of 2 ml. of ethane dithiol in 20 ml. of acetic acid. After the addition of 2 ml. of ethane dithiol and 0.75 ml. of $BF_3$-etherate the solution is stirred for 2 hours. Next 200 ml. of water are added, whereupon the crude 6,6-dithioxy-$\Delta^{5(10)}$-oestrene-17$\beta$-ol-17$\beta$-benzoate is isolated by extraction with ether. Recrystallization from methanol yields the pure product with melting point of 167–169° C. and $[\alpha]_D = +94°$ (chloroform).

Two g. of crude 6,6-dithioxy-$\Delta^{5(10)}$-oestrene-17$\beta$-ol-17$\beta$-benzoate are dissolved in 20 ml. of THF and added to 1 g. of sodium in 100 ml. of liquid ammonia. After stirring for 30 minutes the excess of sodium is removed with ethanol. After evaporation of the ammonia and the usual processing the crude $\Delta^{5(10)}$-17$\beta$-hydroxy-oestrene is obtained. Melting point after recrystallization: 109–111° C.

Example II

By the process described in Example I, the $\Delta^5$-17$\beta$,19-dihydroxy-androstene-17-acetate is converted into the $\Delta^{5(10)}$-6-keto-17$\beta$-hydroxy-oestrene-17-acetate. Melting point: 137.5–138° C. This compound is converted into the corresponding 6-thioketal compound by means of propane dithiol and next into the compound according to Example I by reduction with lithium in liquid ammonia. The same product is obtained using sodium and methylamine or Raney nickel.

Example III

By the processes described in Example I the $\Delta^5$-17$\beta$,19-dihydroxy-17$\alpha$-methyl-androstene is converted into the $\Delta^{5(10)}$-6-keto-17$\beta$-hydroxy-17$\alpha$-methyl-oestrene. Of this compound 2.1 g. are dissolved in 20 ml. of methanol. After cooling down to −10° C. 1 ml. of propane dithiol and 0.5 ml. of $BF_3$-etherate are added, whereupon the mixture is brought up to room temperature while stirring. After standing for 20 minutes the reaction mixture is poured out into water and the $\Delta^{5(10)}$-6,6-propylene-dithioxy-17$\beta$-hydroxy-17$\alpha$-methyl-oestrene is obtained by extraction with ether.

After reduction with lithium in the presence of methylamine the $\Delta^{5(10)}$-17$\beta$-hydroxy-17$\alpha$-methyl-oestrene is obtained. Melting point: 149–151° C.

In the same manner the $\Delta^{5(10)}$-17$\beta$-hydroxy-17$\alpha$-ethyl-oestrene and the $\Delta^{5(10)}$-17$\beta$-hydroxy-17$\alpha$-vinyl-oestrene have been prepared.

Example IV

Three g. of crude 6,17$\beta$-dihydroxy-$\Delta^{5(10)}$-oestrene-6-acetate-17-benzoate are dissolved in 42 ml. of methanol and 21 ml. of dioxane whereupon 3.18 g. of KOH in 10.6 ml. of water are added. Next the mixture is heated to boiling for 1½ hours in nitrogen atmosphere. The reaction mixture is evaporated to a small volume and poured out into icy-water. The crystallisate is filtered off, washed with water and recrystallized from ether to yield $\Delta^{5(10)}$-6,17$\beta$-dihydroxy-oestrene with M.P. 192–203° C. This product is dissolved in 200 ml. of distilled acetone, whereupon at 0° a slight excess of a solution of 8 N chromic acid is added. After standing for 10 minutes the mixture is poured out into water, extracted with $CH_2Cl_2$ and processed as described before. After chromatography over $SiO_2$ and recrystallization from ether the 6,17-diketo-$\Delta^{5(10)}$-oestrene is obtained. Melting point analytical sample: 156–158° C.

Reduction of the 6-thioketal of this compound with sodium in liquid ammonia by the processes described in Example I provided the $\Delta^{5(10)}$-17$\beta$-hydroxy-oestrene. Melting point: 109–112° C.

Example V 0.5 g. of $\Delta^{5(10)}$-6,17$\beta$-dihydroxy-oestrene is dissolved in 20 ml. of benzene after which a solution of 0.42 g. of dichloro dicyano quinone in 15 ml. of dioxane is added. The mixture is stirred for 30 hours at room temperature and subsequently filtered over Hyflo. The filtrate is washed with methylenechloride and evaporated to dryness. The residue is crystallized from ether to yield $\Delta^{5(10)}$-6-keto-17$\beta$-hydroxy-oestrene with melting point of 157–164° C.

In accordance with the method as described in Example I this compound has been converted into $\Delta^{5(10)}$-17$\beta$-hydroxy-oestrene.

I claim:

1. Method for the preparation of $\Delta^{5(10)}$-steroids non-substituted in the 3-position, comprising reacting a $\Delta^{5,6}$-19-hydroxy-steroid of the androstane series non-substituted in the 3-position with an oxidative metal acylate selected from the group consisting of a lead tetraacylate, a silver acylate and a mercury acylate to produce the corresponding $\Delta^{5(10)}$-6-acyloxy-oestrene compound, hydrolyzing said 6-acyloxy compound to the corresponding 6-hydroxy compound, oxidizing the 6-hydroxy compound to the corresponding 6-keto compound, and splitting off the 6-keto group by thioketalization and reduction.

2. The method of claim 1 in which the metal acylate is lead tetraacetate.

3. The method of claim 1 in which the reductive splitting off of the 6-thioketal group is performed with an alkali metal in the presence of a compound selected from liquid ammonia and a lower aliphatic primary amine.

4. The method of claim 1 in which the reductive splitting off of the 6-thioketal group is performed with Raney nickel.

5. The method of claim 1 in which the starting material is a compound of the formula:

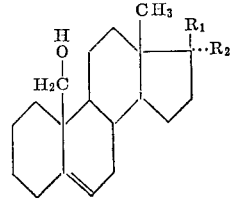

wherein
R$_1$ is selected from the group consisting of hydroxyl and acyloxy derived from organic hydrocarbon carboxylic acids having from 1 to 7 carbon atoms,
R$_2$ is selected from the group consisting of hydrogen, lower alkyl and lower alkenyl, and R$_1$+R$_2$ form together a keto group.

References Cited by the Examiner
UNITED STATES PATENTS
3,178,461 4/1965 Jeger et al. _____ 260—239.55

LEWIS GOTTS, *Primary Examiner.*
ELBERT L. ROBERTS, *Examiner.*
JOHNNIE R. BROWN, *Assistant Examiner.*